Patented June 11, 1940

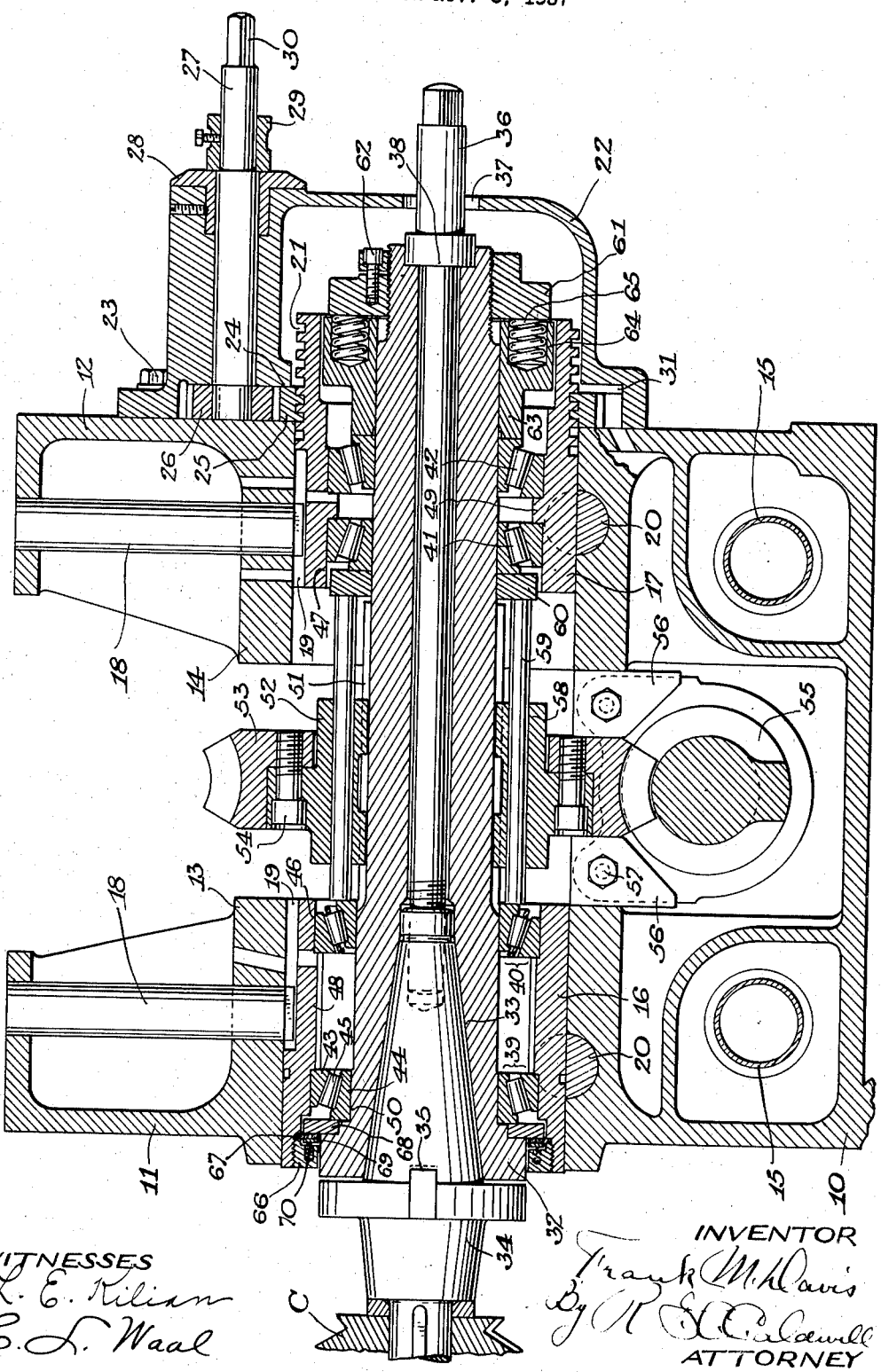

2,203,943

UNITED STATES PATENT OFFICE 2,203,943

MACHINE TOOL SPINDLE MOUNTING

Frank M. Davis, Milwaukee, Wis., assignor to Davis and Thompson Company, West Allis, Wis., a corporation of Wisconsin Application November 6, 1937, Serial No. 173,136

6 Claims. (Cl. 90—11)

The invention relates to spindle mountings for milling machines and other machine tools.

An object of the invention is to provide a machine tool spindle mounting having improved but simplified means for supporting the spindle on anti-friction bearings and for adjusting the bearings to take up play, and a more specific object is to provide means for simultaneously adjusting spaced pairs of tapered roller bearings for the spindle, so as to avoid the necessity for separate adjusting means for each pair of bearings.

Another object of the invention is to provide a bearing adjustment which is readily accessible, which will uniformly pre-load the bearings, and which will automatically take up any play that may occur from wear.

A further object of the invention is to provide a spindle mounting which can be inexpensively but accurately manufactured, which is capable of easy assembly and disassembly, which will permit a substantial axial adjustment of the spindle, which will withstand heavy operating and cutting pressures without derangement or loss of accuracy, and which will have a long service life.

The invention further consists in the several features hereinafter described and claimed.

The accompanying drawing shows a vertical longitudinal sectional view of a spindle mounting of the invention.

In the drawing, 10 designates a frame or support of a machine tool, such as a milling machine. The frame or support is preferably of hollow formation and has spaced, parallel front and rear walls 11 and 12 provided with aligned inwardly projecting tubular portions 13 and 14, respectively, at right-angles to the walls, the inner ends of the tubular portions being spaced apart. Mounted in chambers of the frame or support are coolant-carrying tubes 15, the outer surfaces of which serve to cool the lubricating oil for the machine.

Front and rear sleeves or quills 16 and 17 slidably fit in the aligned openings or bores of the respective tubular portions 13 and 14, and are retained against rotation therein by respective rods 18 extending in the frame radially of the sleeves, each rod having a transversely tongued, key-forming inner end which slidably fits in a keyway 19 of the corresponding sleeve. The tubular portions and sleeves are suitably apertured for the passage of lubricating oil. The sleeves are locked in longitudinally adjusted position in any suitable manner, as by transversely extending wedge rods 20 slidable in the frame and engaging the outer peripheries of the respective sleeves. The rear sleeve 17 is provided with an exterior screw-thread 21 at its rear portion.

The rear end of the rear sleeve 17 is enclosed by a housing or cover 22 which is secured, as by screws 23, one being shown, to the outer face of the wall 12. Adjacent to the frame the housing has a recess 24 which forms with the frame a chamber with spaced parallel walls to confine therein against axial movement a nut-forming ring gear 25. The ring gear surrounds the sleeve 17 and engages its screw-thread 21. At its external periphery, the ring gear 25 meshes with a pinion 26 disposed in an extension of the recess 24 and confined therein against axial movement. The pinion is keyed on a shaft 27 journalled in the housing 22 in parallel relation to the sleeve. The shaft passes through a flanged dial-forming bushing 28 secured in the housing, and carries an index collar 29 forming a micrometer with the flanged bushing. The shaft 27 has a squared outer end 30 adapted to be engaged by a suitable turning tool, not shown, to axially adjust the sleeve 17. The housing 22 has an oil drain passage 31 which communicates with the interior of the frame 10.

A hollow spindle 32 extends within the spaced sleeves or quills 16 and 17 and is provided at its enlarged front end with a tapered opening 33 to detachably receive therein the shank of a tool mandrel 34 adapted to carry a milling cutter C, the mandrel being keyed to the spindle at 35, as usual. A screw-threaded rod 36 in the hollow spindle engages the mandrel for retaining it tightly in the spindle, the wrench-receiving rear end of the rod passing through an opening 37 in the housing 22 and having a shoulder 38 to engage the recessed rear end of the spindle. The spindle is journalled at its front portion on a pair of axially spaced anti-friction bearings 39 and 40, of the tapered roller type, supported by the front sleeve 16, and is journalled at its rear portion on a pair of similar axially spaced anti-friction bearings 41 and 42 supported by the rear sleeve 17. Each bearing is of a well-known type having an outer race member or cup 43, an inner race member or cone 44, and a series of caged, tapered rollers 45 between and in rolling engagement with the race members for resisting both radial and axial thrust. The outer surfaces of the outer race members are cylindrical, and the inner surfaces of the inner race members are also cylindrical. The outer race members or cups of the bearings 39 and 40 are immovably seated in shouldered bores 46 of the front sleeve 16, as by means of a press fit, and the outer race members of the bearings 41 and 42 are similarly seated in shouldered bores 47 of the rear sleeve 17. The sleeves 16 and 17 have inner, intermediate ribs or flanges 48 and 49, respectively, which form the spaced abutment shoulders for the bearing cups 43, these shoulders facing away from each other. The inner race member or cone of the bearing 39 is immovably seated on a shouldered portion 50 of the spindle, but the inner race members or cones of the other three bearings 40, 41 and 42 are slidably mounted on the spindle, the slidable fit being sufficiently close, as in a tap fit, to prevent rotation of these race members on the spindle. Each bearing pair forms a double opposed tapered roller bearing for the spindle.

The portion of the spindle between the bearings 40 and 41 is exteriorly splined at 51 and is engaged by an interiorly splined driving hub 52 to which a worm ring gear 53 is secured by screws 54. The ring gear is driven by a worm 55 and is confined against axial shifting by shoes 56 which are secured by screws 57 to the frame 10 between the spaced tubular portions 13 and 14 of the frame. The shoes bear against the opposite side faces of the ring gear at regions adjacent to the worm.

The hub 52 has formed therethrough a plurality of equally spaced bores 58 extending parallel to the spindle axis. Thrust rods 59, preferably six or more, depending on the size of the machine, extend slidably through the bores and bear at their front ends on the slidable inner race member of the bearing 40 and at their rear ends against a slidable ring or washer 60 which surrounds the spindle and abuts against the slidable inner race member of the bearing 41.

A nut 61 is screw-threaded on the reduced rear end of the spindle and is clamped in adjusted position by a screw 62 passing through a split portion of the nut. A collar 63 slidably surrounds the spindle between the nut and the rearmost bearing 42, and bears against the slidable inner race member of this bearing. The rear portion of the collar is provided with a plurality of rearwardly opening bores or pockets 64 extending parallel to the spindle axis and housing therein respective coiled springs 65 which bear against the nut 61.

The coiled springs 65 are held under considerable compression by the nut 61, and the spring pressure is transmitted through the several bearings in serial relation so as to take up all axial and radial play at the spindle, and to pre-load the bearings. The spring pressure is transmitted through the sidable inner race member of the bearing 42, the outer race members of the bearings 42 and 41 in the interiorly shouldered sleeve 17, the slidable inner race member of the bearing 41, the thrust ring 60, the thrust rods 59, the slidable inner race member of the bearing 40, the outer race members of the bearings 40 and 39 in the interiorly shouldered sleeve 16, the inner race member of the bearing 39, and the shouldered portion 50 of the spindle. A single, readily accessible adjusting means thus takes up play in the four axially spaced tapered roller bearings, and the use of separate adjusting means for each pair of bearings is avoided. The spring-loaded bearings also avoid the danger of binding or loosening under temperature changes. The nut 61 is here shown to be slightly spaced from the rear end of the collar 63, but in some instances these parts may be in abutment.

A collar 66 screw-threaded into the counter-bored front end of the sleeve 16 clamps the peripheral portion of an oil-sealing washer 67 of leather or other suitable material. The washer bears against the flat face of a hardened metal ring or washer 68 which is carried on the spindle and is confined by the inner race member of the bearing 39. A metal ring or washer 69 urges the leather washer against the spindle ring 68 and is under the pressure of coiled springs 70 carried in the collar 66.

In assembling the device, the nut 61 is tightened to impose the desired spring-pressure on all of the bearings, so as to remove all axial and radial play, and this adjustment is maintained by the locking screw 62. In effecting this adjustment, the slidable sleeves 16 and 17 are urged relatively toward each other, the spring pressure being transmitted through the sleeves. Ordinarily, this original adjustment will serve for an indefinitely long period, such as the life of the machine, since any wear which may occur at the several bearings will automatically be taken up by the springs 65. However, readjustment can easily be effected if for any reason this is found necessary, access to the adjusting nut 61 being had by removing the housing 22. Since only one adjusting means is required for the several bearings, the construction is considerably simplified, and it is not necessary to have access to the interior of the frame 10 for bearing adjustment.

In setting up the device for use, the wedges 20 are loosened, and the spindle and sleeve assembly or unit are adjusted axially by the pinion shaft 27 to obtain the desired depth of cut, the wedges being tightened after the desired adjustment is reached. In this adjustment the slidable sleeves or quills are prevented from rotating by the key rods 18. The nut-forming ring gear 25 effects axial movement of the rear sleeve 17, and this axial movement is communicated through the spindle to the slidable front sleeve 16.

In operation, the spindle is driven by the worm 55 meshing with the ring gear 53 which transmits power through the hub member 52 splined on the spindle. The several tapered roller bearings supporting the spindle are pre-loaded and entirely free from radial and axial play, so that chattering is avoided and accurate work is produced. Any axial thrust on the spindle is transmitted through the rear quill 17 to the nut-forming ring gear 25 which is confined against axial movement by the frame 10 and housing 22. The axial thrust is also transmitted to the wedge rods 20.

While the invention is particularly useful for spindles intended to be longitudinally adjusted, it is also applicable to spindles which are not required to move axially.

What I claim as new and desire to secure by Letters Patent is:

1. A spindle mounting, comprising a support, a pair of aligned sleeves slidable in said support, two pairs of axially spaced outer bearing race members carried in said respective sleeves, there being a pair of said race members fixed in each sleeve, a spindle extending within said sleeves, two pairs of axially spaced inner bearing race members carried by said spindle and rotatable therewith, tapered rollers interposed between the pairs of inner and outer race members to form two pairs of tapered roller bearings each resisting both radial and axial thrust, each pair of bearings being in opposed axial thrust relation, an end inner race member being fixed on said spindle and the remaining three inner race members each being axially slidable on said spindle, thrust means rotatable with the spindle for transmitting axial thrust between the two intermediate inner race members, and adjusting means on an end portion of said spindle acting on the endmost slidable inner race member to adjust all of said bearings.

2. A spindle mounting, comprising a support, a pair of aligned sleeves slidable in said support and each having interior shoulders facing away from each other, two pairs of axially spaced outer bearing race members carried in said respective sleeves and engaging said shoulders, there being a pair of said race members in each sleeve, a spindle extending within said sleeves, two pairs of axially spaced inner bearing race members carried by said spindle and rotatable therewith, tapered rollers interposed between the pairs of inner and outer race members to form two pairs of tapered roller bearings each resisting both radial and axial thrust, the pair of bearings in each sleeve being in opposed axial thrust relation, an end inner race member being fixed on said spindle and the remaining three inner race members each being axially slidable on said spindle, thrust means rotatable with the spindle for transmitting axial thrust between the two intermediate inner race members, and adjusting means on an end portion of said spindle acting on the endmost slidable inner race member to adjust all of said bearings.

3. A spindle mounting, comprising an apertured support, aligned front and rear sleeves slidably carried therein, a spindle extending within said sleeves and having a tool-engaging front end portion, a plurality of more than two anti-friction bearings each with rollable members for supporting said spindle from said sleeves, adjusting means carried by one end portion of said spindle and common to all of said bearings for taking up play in said bearings, said sleeves and bearing-supported spindle forming an axially movable unit, a housing secured to said support and enclosing said rear end portion of said spindle, and means carried by said housing for axially adjusting said spindle-carrying sleeves and having an actuating connection with said rear sleeve.

4. A spindle mounting, comprising an apertured support, aligned front and rear sleeves slidably carried therein, a spindle extending within said sleeves and having a tool-engaging front end portion and an intermediate drive portion between said sleeves, said spindle being rotatably carried by said sleeves and having a connection with both of said sleeves for axial movement therewith as a unit, and means at the rear of said support having an actuating connection with said rear sleeve to effect axial adjustment of the unit comprising said spindle and said sleeves.

5. A spindle mounting for a machine tool, comprising a support having aligned openings, a tool spindle extending within said openings and having a tool-engaging front end portion, a pair of front and rear sleeves fitting in said respective openings and relatively movable with respect to each other in an axial direction, a pair of anti-friction bearings of the tapered roller type having their outer races fixed in said front sleeve and having their inner races fitting on and rotatable with said spindle, the front inner race being fixed on said spindle and the rear inner race being slidable on said spindle, said bearings being in opposed axial thrust relation, a second pair of anti-friction bearings each having opposed races and interposed rollable members and each having one race slidable on and rotatable with said spindle and the other race in axial thrust engagement with said rear sleeve, said second pair of anti-friction bearings being in opposed axial thrust relation and at least one of said bearings being of the combined axial and radial thrust type and having its outer race fitting in said rear sleeve, means rotatable with said spindle for transmitting axial thrust between the two intermediate races slidable on said spindle, and adjusting means common to all of said bearings for taking up play therein, said adjusting means being carried on the rear portion of said spindle and acting on the rearmost slidable race of said spindle to transmit axial adjusting movement serially through said several anti-friction bearings.

6. A spindle mounting for a machine tool, comprising a support having aligned openings, a tool spindle extending within said openings and having a tool-engaging front end portion, a pair of front and rear sleeves slidably fitting in said respective openings and relatively movable with respect to each other in an axial direction, a pair of anti-friction bearings of the tapered roller type having their outer races fixed in said front sleeve and having their inner races fitting on and rotatable with said spindle, the front inner race being fixed on said spindle and the rear inner race being slidable on said spindle, said bearings being in opposed axial thrust relation, a second pair of anti-friction bearings each having opposed races and interposed rollable members and each having one race slidable on and rotatable with said spindle and the other race in axial thrust engagement with said rear sleeve, said second pair of anti-friction bearings being in opposed axial thrust relation and at least one of said bearings being of the combined axial and radial thrust type and having its outer race fitting in said rear sleeve, means rotatable with said spindle for transmitting axial thrust between the two intermediate race members slidable on said spindle, said spindle and said sleeves and bearings forming an axially movable unit, adjusting means common to all of said bearings for taking up play therein, said adjusting means being carried on the rear portion of said spindle and acting on the rearmost slidable race of said spindle to transmit axial adjusting movement serially through said several anti-friction bearings, and means adjacent to the rear end portion of said spindle having an actuating connection with said rear sleeve to effect axial adjustment of the unit comprising said spindle and said sleeves and bearings.

FRANK M. DAVIS.